United States Patent Office 3,275,476
Patented Sept. 27, 1966

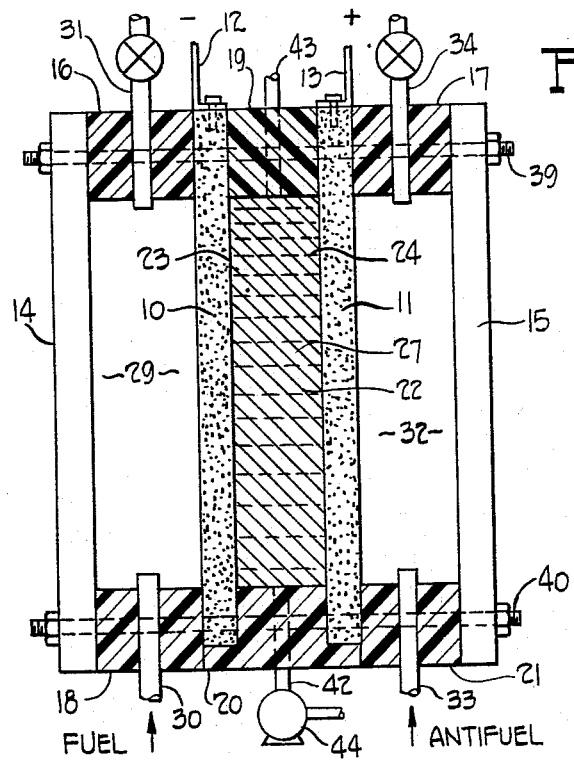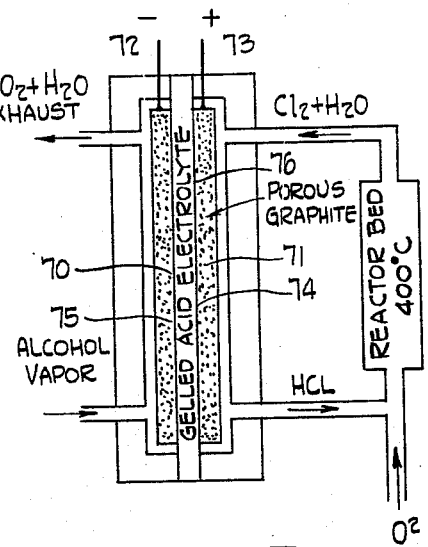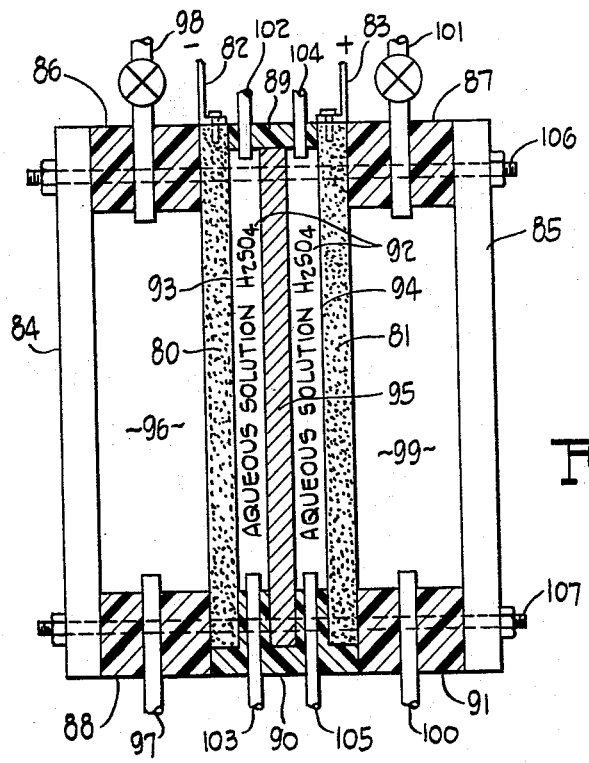

3,275,476
ELECTROCHEMICAL REACTION APPARATUS
Robert A. Rightmire, Twinsburg, and Philip S. Fay, Cleveland, Ohio, assignors to The Standard Oil Company, Cleveland, Ohio, a corporation of Ohio
Filed Sept. 20, 1961, Ser. No. 139,428
2 Claims. (Cl. 136—86)

This invention relates generally to the conversion of one form of energy to another, and more particularly to an improved apparatus and system for accomplishing such conversion electrochemically. More specifically, this invention relates to improvements in recycling and regenerating electrochemical reactant materials. For exemplary purposes, this invention will be described with reference to a fuel cell, it being understood, however, that these principles are applicable to other types of electrochemical reaction apparatus as well.

The direct conversion of chemical energy into electrical energy is accomplished by causing chemical reactions to take place between reactive materials at the junctures between spaced electron conductors, which themselves may be such reactive materials, and an intermediate ion-transfer medium, to form a continuous energy exchange system. The reactive materials are separately supplied to each juncture so that the charge exchange of the reaction takes place ionically through the ion transfer medium forming an internal circuit, and electronically through the electron conductors, forming an external circuit. Thus, where the reactive materials are continuously supplied and an electrical load coupled to the external circuit, it is possible to electrochemically convert the energy of chemical reaction directly into electrical energy in the external circuit.

By way of example, where hydrogen is employed as one of the materials and chlorine as the other, the oxidation and reduction of these materials at the corresponding junctures between the electronic and ionic conductors generates electrical energy in the external circuit and produces hydrogen chloride as a by-product of the reaction. When each of the materials is continuously supplied and consumed within such an apparatus, it may be likened, respectively, to a fuel, and to an antifuel, the former of which is selected to yield electrons in its chemical reaction and the latter of which is selected to accept electrons.

Normally, in any such apparatus, the fuel and antifuel are supplied in a relatively stable condition and some means is required for activating their conversion from their normally stable reactant state to their reaction product state. It is believed that such conversion of the fuel and antifuel takes place by means of chemical adsorption to a chemisorbed state, and then desorption to their reaction product state at the corresponding junctures between the electron and ion conductors. Such conversion of the fuel and antifuel is not practically self-motivating and is, therefore, preferably activated by the introduction of some means in the ion transfer medium which will promote desorption at each juncture. In the preferred embodiments such means are ionic in nature and coact to provide ions in the ion transfer medium. The reaction products may be removed from the apparatus in any convenient manner and preferably as they are formed.

For the purpose of this description, the apparatus for accomplishing the direct conversion of chemical energy to electrical energy will be identified as a fuel cell. The electron conductors will be identified as electrodes and more specifically as the anode and cathode, respectively, depending upon whether they are on the fuel or antifuel side of the cell. The fuel will be identified throughout as any substance which is oxidizable relative to the antifuel, which will in turn be identified as many substance which is reducible relative to the fuel; where oxidation and reduction, respectively, contemplate the release and acceptance of electrons.

A medium which is capable of conducting an electrical charge associated with an atom or a group of atoms, i.e., ions, will be referred to as an an ion transfer medium. The ion transfer medium serves to isolate the electronic conductors from each other in the internal circuit. The junctures between the electrodes and the ion transfer medium will be identified throughout as reactive interfaces. The activating means for promoting the conversion of the fuel and the antifuel from their reactant state through the chemisorbed state to the reaction product state will be more specifically identified in conjunction with their functional coaction in the cell as an adsorber and a desorber. The ions contained in the ion transfer medium usually activate desorption while adsorption is usually promoted by an activator coacting with or as the electrode. This overall reaction will be referred to as an electrochemical reaction.

The resulting ion transfer medium may be neutral, or it may be acidic or basic in character. A neutral medium will favor the transfer of both anions and cations. A basic medium normally favors the transfer of anions, i.e. it has the character of an electron donor. An acidic medium normally favors the transfer of cations, i.e. it has the character of a proton donor. Normally, a fuel which is of an electron donor character, i.e. is capable of being oxidized, will undergo chemical reaction at or near the fuel electrode, in an electron donor type medium, e.g. a basic medium. In an electron acceptor-type medium, e.g. an acidic medium, the chemical reaction will normally occur at or near the antifuel electrode.

In a conventional fuel cell-type electrochemical reaction apparatus, the fuel and the antifuel are desorbed by respective coacting activator ions. The resulting fuel and antifuel derived ions then combine to produce a reaction product in the liquid phase which is removed from the apparatus. We have found that under certain circumstances hereinafter more particularly described, we can enhance the overall electrochemical reaction and increase the efficiency of the apparatus by chemically reconstituting the fuel and/or antifuel externally of the apparatus in the vapor phase, and reintroducing the reconstituted fuel and/or antifuel to the electrochemical reaction apparatus. In one embodiment of the present invention, the fuel reaction and the antifuel reaction occur respectively in the environment of their own subsystems, and the subsystems are isolated from each other by a medium that is permeable to either a fuel derived ion (e.g. hydrogen) or an antifuel derived ion (e.g., halide). The respective reaction products from each subsystem are desirably independently removed, and in the preferred embodiment, at least one of them is reconstituted by chemical oxidation or reduction externally to the basic electrochemical reaction apparatus and resupplied in the form of the corresponding fuel and/or antifuel.

Briefly stated, the present invention is in an electrochemical reaction apparatus or system characterized by the presence of a pair of spaced electrodes and an ion transfer medium disposed therebetween and forming an interface with each of said electrodes. Anions and cations are provided in the ion transfer medium by means of an activator, which may be a water soluble acid, base or salt. Individual means for supplying electrochemical reactants to each of said electrodes are also provided. The electrochemical reactants which in the specific case of a fuel cell are referred to as a fuel and an antifuel, undergo electrochemical reaction at the interface to form respective reaction products. Means are provided for removing the reaction products. In the case of the fuel or in the case of the antifuel, or both, the reaction product is removed in the liquid phase and introduced into means external to the apparatus for chemically reconstituting the electrochemical reactant material in the vapor phase. In the case of a fuel, the fuel may be reconstituted in the vapor phase by reduction with hydrogen or a hydrogen yielding material. In the case of the antifuel, the antifuel may be reconstituted by chemical reaction in the vapor phase with an oxidant such as oxygen from the air. When the fuel and/or antifuel has been reconstituted, it is then recycled to the electrochemical reaction apparatus. Vapor phase reconstitution may be effected at any pressure ranging from sub-atmospheric to super-atmospheric and a temperature sufficient to vaporize the reaction product. Usually however, we employ atmospheric pressure and a temperature of from 100° C. to 600° C. in the presence of a suitable conversion catalyst.

In the annexed drawings:

FIG. 1 is a diagrammatic and schematic illustration of an electrochemical reaction apparatus useful in accordance with the present invention.

FIG. 2 is a diagrammatic representation of an electrochemical system employing the principles of the present invention.

FIG. 3 shows another embodiment of the present invention.

With reference to FIG. 1, there is here shown in diagrammatic form a fuel cell electrode 10 and an antifuel electrode 11 in insulated and spaced relation. Electrodes 10 and 11 are provided with terminals 12 and 13 which are adapted to be connected to an external circuit to complete the electron conducting portion of the apparatus. The external circuit is not shown. End plates 14 and 15 are provided to close off the ends of the unit cell shown in FIG. 1. In multiple assemblies of unit cells, the cells may be stacked in such a way that end plates will be provided only at the ends of a horizontally repeating series of cell units. End plates 14 and 15 may be fabricated of metal, impervious graphite, ceramic or plastic materials provided the material selected is chemically inert toward the fuel or antifuel materials utilized in the adjacent chambers. In addition, if the end plates are fabricated from an electrically conducting material, suitable electrical insulating gaskets should be provided to insulate the end plates from electrically active components of the cell. Spacer members 16, 17, 18, 19, 20 and 21 are provided to maintain the proper spatial relationship between the respective end plates 14 and 15 and the electrodes 10 and 11. The spacers 16, 17, 18, 19, 20 and 21 may be fabricated of metal, impervious graphite, ceramic or plastic materials. The material of construction of such spacers should not react chemically with the fuel or antifuel or the ion transfer medium, and provision should be made for electrically insulating the spacers from the adjacent electrode in the event that an electrically conducting material is selected.

Both the fuel electrode 10 and the antifuel electrode 11 may be fabricated of any porous electrically conducting material which is inert to chemical attack by the reactants and the ion transfer medium. Electrodes fabricated of porous carbon have been found satisfactory and quite inexpensive. While porous carbon as such may be employed as the electrode, it has been found desirable to further enhance the electrochemical activity by providing electrodes of a porous metal such as porous sintered nickel, or the interpersion of a metal, e.g. platinum, or metal oxide e.g. vanadium pentoxide activator on the surface of a porous carbon electrode. Such solid activators are believed to enhance adsorption of the fuel or antifuel material prerequisite to chemisorption and desorption at the respective electrode reaction interfaces.

Disposed between electrodes 10 and 11 and electronically insulating such electrodes is an ion transfer medium which includes an ion-containing and conducting medium.

While any medium capable of transferring an electrical charge by means of ions between electrodes 10 and 11 may be employed, in the specific embodiment shown in FIG. 1 the medium 22 is an aqueous 6 molar sulphuric acid solution supported on a porous clay matrix 27. Concentrated hydrochloric acid could also be used as a proton donor type ion-containing and conducting medium. This medium forms reactive interfaces 23 and 24 respectively with the electrodes 10 and 11. The fuel subsystems which is an example of a relatively reducible subsystem, includes the fuel reservoir 29, the fuel electrode 10 and the interface 23. The antifuel subsystem, which is an example of a relatively oxidizable subsystem, includes the antifuel reservoir 32, the antifuel electrode, and the interface 24.

In certain embodiments, the ion transfer medium at the respective reaction interfaces 23 and 24 may be a pair of aqueous sulphuric acid solutions maintained separate by means of a barrier such as a thin palladium foil. Palladium has the property of permeability to hydrogen. Hence, hydrogen ions resulting in the course of the electrochemical reactions may pass through the palladium barrier under the influence of a concentration gradient of hydrogen ions for reaction with an ion, e.g. halogen derived from the antifuel electrochemical reaction. Thus, the aqueous sulphuric acid solution and the palladium barrier coact to form an ion transfer medium. Any hydrogen bridge type barrier may be used to isolate the subsystems while permitting transfer of hydrogen either molecularly, atomically or ionically from one subsystem to the other.

The chamber 29 defined by the end plate 14 and fuel electrode 10, and marginally enclosed by spacers 16, 18 and 20 is adapted to receive a fuel, for example gaseous ethyl alcohol or a fuel containing material, for example ethyl alcohol dissolved in water which is circulated through the inlet 30 and the outlet 31. The outlet 31 may be provided with valve means for regulating the rate of flow of material through the fuel chamber.

The antifuel side of the cell is similarly provided with an antifuel chamber 32 having an inlet 33 and an outlet 34 in spacers 21 and 17, respectively, which spacers together with 20, marginally enclose the chamber 32. Means are thus provided for circulating the antifuel, or antifuel-containing material, through the chamber 32.

The products of electrochemical reaction are under most circumstances soluble in the aqueous ion-containing and conducting medium 22, e.g. when the fuel is propylene and the antifuel is chlorine, the principal product of reaction is HCl which is soluble in 6 molar $H_2SO_4$ solution. The ion-containing and conducting medium 22 with the electrochemcial reaction product dissolved therein may be exahusted from the cell in the liquid phase through outlet 43. By means of a conventional thermal or vacuum stripping operation, the reaction product may be stripped from the ion-containing and conducting medium 22 for vapor phase regeneration, e.g. regeneration of the antifuel chlorine by catalytic oxidation of HCl in the presence of a cuprous chloride-silica gell catalyst at about 400° C. The medium 22 is then recycled to the cell through pump 44 and inlet 42.

The products of electrochemical reaction of a hydrocarbon fuel, e.g. carbon dioxide and other oxidation products are swept from the cell through outlet 31 along with any unused fuel. A specific example of a fuel which reacts electrochemically in the presence of an aqueous 6 molar $H_2SO_4$ medium to form a reaction product removable in the liquid phase and capable of vapor phase regeneration by reduction with hydrogen is $SO_2$. This material reacts to form $SO_3$ in solution in the ion-containing and conducting medium and is reduced in the vapor phase in the presence of a reduction catalyst (Raney nickel) to regenerate $SO_2$ fuel.

With more particular reference to FIG. 3, there is here shown in diagrammatic form another embodiment of a fuel cell useful in accordance herewith and having spaced electrodes 80 and 81 in insulated and spaced relation. Electrode 80 is a fuel electrode and electrode 81 is an antifuel electrode. Electrodes 80 and 81 are provided with terminals 82 and 83 which are adapted to be connected to an external circuit to complete the electron conducting portion of the apparatus. The external circuit is not shown. End plates 84 and 85 are provided to close off the ends of the unit cell shown in FIG. 3, In multiple assemblies of unit cells, the cells may be stacked in such a way that end plates will be provided only at the ends of a horizontally repeating series of cell units. End plates 84 and 85 may be fabricated of metal, impervious graphite, ceramic or plastic materials provided the material selected is chemically inert toward the fuel or antifuel materials utilized in the adjacent chambers. In addition, if the end plates are fabricated from an electrical conducting material, suitable electrical insulating gaskets should be provided to insulate the end plates from electrically active components of the cell. Spacer members 86, 87, 88, 89, 90 and 91 are provided to maintain the proper spatial relationship between the respective end plates 84 and 85, and the electrodes 80 and 81. Spacers 86, 87, 88, 89, 90 and 91 may be fabricated of metal, impervious graphite, ceramic or plastic materials. The material of construction of such spacers should not react chemically with the fuel or antifuel or the ion transfer medium, and provision should be made for electrically insulating the spacers from the adjacent electrodes in the event that an electrically conducting material is selected.

Both the fuel electrode 80 and the antifuel electrode 81 may be fabricated of any porous, electrically conducting material which is inert to chemical attack by the reactants and the ion transfer media. Electrodes fabricated of porous carbon have been found satisfactory and quite inexpensive. While porous carbon as such may be employed as the electrode, it has been found desirable to further enhance the electrochemical activity by providing electrodes of a porous metal such as porous sintered nickel, or an interspersion of a metal, e.g. platinum, or metal oxide, e.g. vanadium pentoxide activator, on the surface of a porous graphite electrode. Such solid activators are believed to enhance adsorption of the fuel or antifuel material prerequisite to chemisorption and desorption at the respective electrode reaction interfaces.

Disposed between electrodes 80 and 81 and electronically insulating such electrodes in an ion transfer medium which includes a pair of ion-containing and conducting media 92 and an ion permeable barrier 95 which isolates the fuel subsystem from the antifuel subsystem. While any medium capable of transferring an electrical charge by means of ions between electrodes 80 and 81 may be employed, in the specific embodiment shown in FIG. 3, the medium 92 is composed on an aqueous 6 normal sulphuric acid solution. This medium forms reactive interfaces 93 and 94 respectively with the electrodes 80 and 81.

The portions of the ion transfer medium at the respective reaction interfaces 93 and 94 are maintained separate by means of the barrier 95 which, in the specific embodiment shown in FIG. 3 is preferbly a thin palladium foil. Palladium has the property of permeability to hydrogen. Hence, hydrogen ions resulting in the course of the electrochemical reaction may pass through the palladium barrier 95 for reaction with an ion derived from the antifuel electrochemical reaction. Thus, the aqueous sulphuric acid solution and the palladium barrier 95 coact to form an ion transfer medium.

The chamber 96 defined by the end plate 84 and the fuel electrode 80, and marginally enclosed by spacers 86 and 88, is adapted to receive a fuel e.g. gaseous $SO_2$ or fuel containing material, e.g., $SO_2$ dissolved in aqueous 6 N $H_2SO_4$, which is circulated through inlet 97 and outlet 98.

The antifuel side of the cell is similarly provided with an antifuel chamber 99 having an inlet 100 and an outlet 101 in spacers 91 and 87, respectively, which spacers marginally enclose the chamber 99. Means are thus provided for circulating the antifuel or antifuel-containing material through chamber 99.

A convenient fuel material is molecular sulphur dioxide as a gas or an aqueous sulphuric solution of sulphur dioxide. This material may be introduced into the fuel chamber 96. An aqueous 6 N $H_2SO_4$ solution is slowly circulated through the chamber on the opposite side of the electrode 80 by means of inlet 103 and outlet 102 to provide the ion-containing and conducting medium 92. Although co-current flow is shown for these respective streams, counter-current flow may also be employed. Thus, $SO_2$ gas may be introduced through inlet 97, and aqueous 6 N $H_2SO_4$ as the ion-containing and conducting medium through inlet 103. At the surface of the fuel electrode 80, sulphur dioxide becomes adsorbed at the interface 93 and proceeds to the chemisorbed state under the influence of the solid surface which may, as indicated above, contain an activator for adsorption such as nickel oxide, vanadium pentoxide, molbdenum oxides, etc. The sulphate ion in the aqueous sulphuric acid solution 92, forming an ion-containing and conducting medium, is an activator for desorption of the chemicsorbed sulphur dioxide and reacts therewith to form sulphur trioxide in aqueous acidic solution with the release of two electrons to the electrode 80 and the external circuit.

The aqueous sulphuric acid solution containing molecular sulphur trioxide produced in the fuel subsystem by the electrochemical reaction is removed through the outlet 102, and stripped by conventional means where water vapor together with carbon dioxide are separated from the $SO_3$-sulphuric acid mixtures. Thereafter the sulphur trioxide together with sulphuric acid is passed through a furnace which raises the temperature of the mixture to approximately 550° C. The hot gases are mixed with a reducing agent which in the specific instance may be a hydrocarbon, namely propane. Upon passing through a converter similar to that shown in FIG. 2 a mixture of hydrocarbon and sulphur trioxide in the presence of some water and a vanadium pentoxide catalyst at 500° C. reacts to restore the original sulphur dioxide fuel, in combination with sulphuric acid.

The reaction products from this conversion are returned to the fuel subsystem in the manner indicated above where the sulphur dioxide again undergoes electrochemical conversion to the fuel reaction product, sulphur trioxide.

A coacting antifuel e.g. a halogen such as chlorine, is simultaneously introduced into antifuel chamber 99, while ion-containing and conducting medium 92 is introduced through inlet 100 and exhausted through outlet 101, together with the cell reaction product, e.g. hydrogen halide. The cell of FIG. 3 will operate at temperatures ranging from room temperature up to the boiling point of the media 92 at the pressures imposed thereon.

FIG. 2 is a diagrammatic and schematic illustration of a preferred type of fuel cell in which the antifuel material is restored by chemical means in the vapor phase, and the fuel is consumed within the cell to form a reaction product. Accordingly, there is shown in FIG. 2 a fuel cell comprising a fuel electrode 70 and an antifuel electrode 71 in spaced relation to each other. Suitable leads 72 and 73 from these electron conducting members 70 and 71 are provided and adapted to be connected to an external circuit, not shown. The fuel electrode 70 is conveniently formed of platinized porous graphite having an adsorption activator, e.g., platinum in finely divided form on the reaction surface thereof. Disposed between the electrodes 70 and 71 is an ion-transfer medium 74 which in the example illustrated in FIG. 2 is conveniently a gelled aqueous acidic solution, e.g. a bentonite-sulphuric acid-water gel. The fuel material, for example ethyl alcohol, is fed to the fuel electrode 70 and being a relatively oxidizable material, undergoes electrochemical reaction at the interface 75 to form hydrogen ions in the ion transfer medium 74, carbon dioxide, and water as electrochemical reaction products, with the release of electrons to the fuel electrode 70.

The antifuel is preferably a halogen such as chlorine, bromine, iodine, or fluorine. Molecular gaseous chlorine desirably although not necessarily in the presence of water vapor is conveniently fed to the antifuel electrode 71, which it permeates. At the reaction interface 76, the chlorine is reduced with the acceptance of an electron from the antifuel electrode 71 and the reaction with hydrogen ions derived from the fuel produces an aqueous solution of hydrochloric acid. Where bromine is used as the antifuel, hydrogen bromide in aqueous solution is formed. The hydrogen halide solution is withdrawn from the cell as shown in FIG. 2, admixed with an oxidizing agent such as air, and passed into a reactor containing a cupric chloride catalyst supported on silica gel. The reaction temperature within the catalytic converter is between 300° C. and 460° C. under which conditions hydrogen chloride or hydrogen bromide is readily oxidized in the vapor phase to restore the original antifuel, chlorine, or bromine, as the case may be.

Electrochemical cells of the type hereinbefore described may be operated at temperatures from room temperature to about 200° C. under atmospheric or superatmospheric pressure. Instead of ethyl alcohol as the fuel, there may be used methyl alcohol, isopropyl alcohol, butyl alcohol, ethylene, propane, propylene, butane, pentane, hexane, cyclohexane, or the like. Water soluble fuels, e.g. alcohols, may be introduced as aqueous solutions, or as vapor mixtures, the latter being preferred.

Where the antifuel is bromine, it may be conveniently dissolved in a supply of aqueous sulphuric acid, e.g. aqueous 6 molar $H_2SO_4$, and introduced as a composite antifuel-containing material into the antifuel chamber 32. The bromine undergoes electrochemical reaction at the interface 24 (FIG. 1) of the antifuel electrode 11 according to the equation:

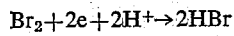

$$Br_2 + 2e + 2H^+ \rightarrow 2HBr$$

The hydrogen ions for the reaction are continuously supplied by transfer of hydrogen, which acts as a hydrogen bridge, and from the aqueous sulphuric acid solution itself. The electrons are supplied from the external circuit through the antifuel electrode 11.

The aqueous sulphuric acid solution containing the hydrogen bromide antifuel electrochemical reaction product in solution may be removed through the outlet 43. The hydrogen halide is then separated from the aqueous sulphuric acid solution by conventional means, not shown, which is then returned to the antifuel subsystem. The hydrogen bromide reaction product may then be treated in an analogous manner as the chlorine above described. The temperature of the hydrogen bromide solution is raised to about 450° C., the hot gases admixed with an oxidizing agent, for example air, and passed into a reactor bed. The mixture of air, hydrogen bromide and some retained water vapor in the presence of a cupric chloride silica gel catalyst at 300° C.–400° C. or a platinized alumina catalyst reacts according to the aquation:

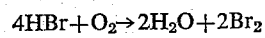

$$4HBr + O_2 \rightarrow 2H_2O + 2Br_2$$

The water may be removed by conventional means. Thus, the antifuel is restored from the antifuel electrochemical reaction product. The restored antifuel is reintroduced into the antifuel inlet 33 in the antifuel subsystem where the bromine again reacts electrochemically to begin another cycle. The effluent from the antifuel chamber 32 may be reintroduced into the system at any convenient point.

Thus, there has been provided an electrochemical reaction apparatus, such as a fuel cell, in which the overall cell reaction has been enhanced by providing fuel-containing and/or antifuel-containing reactant material which reacts electrochemically to form reaction products conveniently removed from the apparatus in the liquid phase. One or both of the respective reaction products of the subsystems is independently removed from the apparatus and may be chemically reconverted in the vapor phase to a fuel or antifuel material for reintroduction into the apparatus.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. A process for the production of electrical energy from an electrochemical reaction at temperatures ranging from about room temperature to about 200° C. in an electrochemical reaction system characterized by a relatively reducible subsystem and a relatively oxidizable subsystem, each including an electrochemically reactant material adapted to coact electrochemically through an aqueous ion-transfer medium, each of said subsystem including an electrode adapted to be coupled to an external electron conducting circuit, and an aqueous ion-transfer medium disposed between said electrodes and forming an interface therewith, said process comprising the steps of:
   (a) adding sulphuric acid activator to the ion-transfer medium to a concentration equivalent to 6 molar acid;
   (b) supplying an alcohol fuel containing from 1 to 4 carbon atoms to the relatively oxidizable subsystem;
   (c) supplying elemental halogen antifuel to said relatively reducible subsystem;
   (d) maintaining each of said subsystems in the liquid phase;
   (e) removing the reaction by-product from said relatively oxidizable subsystem;
   (f) removing hydrogen halide reaction by-product from said relatively reducible subsystem in the liquid phase oxidizing said hydrogen halide by-product externally of said reaction system in the gas phase over a vanadium pentoxide catalyst to convert it to water and gaseous halogen antifuel; and
   (g) recycling the reconstituted halogen to said relatively reducible subsystem.

2. The process of claim 1 wherein the fuel is ethyl alcohol and the antifuel is chlorine.

References Cited by the Examiner

UNITED STATES PATENTS

| | | | |
|---|---|---|---|
| 2,925,455 | 2/1960 | Eidensohn | 136—86 |
| 3,088,990 | 5/1963 | Rightmire et al. | 136—86 |

FOREIGN PATENTS

| | | |
|---|---|---|
| 199,736 | 6/1923 | Great Britain. |

OTHER REFERENCES

Proceeding: Thirteenth Annual Power Sources Conference, April 28, 1959, pp. 122–124.

Status Report on Fuel Cells, ARO Report No. 1, June 1959, pp. 18–20.

Status Report on Fuel Cells, ARO Report No. 1, June 1959, pp. 22–23.

WINSTON A. DOUGLAS, *Primary Examiner.*

JOHN R. SPECK, JOHN H. MACK, ALLEN B. CURTIS,
*Examiners.*

H. FEELEY, *Assistant Examiner.*